United States Patent [19]

Miller

[11] Patent Number: 5,073,388

[45] Date of Patent: Dec. 17, 1991

[54] AQUEOUS SOLUTION FOR USE IN PRODUCING A SOLID ANIMAL FEED SUPPLEMENT

[75] Inventor: Alex E. Miller, Placentia, Calif.

[73] Assignee: Union Oil Company of California, Los Angeles, Calif.

[21] Appl. No.: 587,161

[22] Filed: Sep. 19, 1990

Related U.S. Application Data

[63] Continuation of Ser. No. 271,599, Nov. 15, 1988, abandoned, which is a continuation-in-part of Ser. No. 876,993, Jun. 19, 1986, Pat. No. 4,800,092, which is a continuation-in-part of Ser. No. 828,149, Feb. 7, 1986, Pat. No. 4,798,727.

[51] Int. Cl.$^5$ ............................................... A23K 1/02
[52] U.S. Cl. ..................................... 426/74; 426/658; 426/807
[58] Field of Search ............... 426/69, 658, 74, 807, 426/103; 127/30, 29

[56] References Cited

U.S. PATENT DOCUMENTS

| | | |
|---|---|---|
| 2,566,549 | 9/1951 | Beckwith et al. . |
| 2,611,702 | 9/1952 | Potishman . |
| 2,843,492 | 7/1958 | Bart et al. . |
| 2,967,106 | 1/1961 | Kviesitis . |
| 2,991,179 | 7/1961 | Kviesitis et al. . |
| 3,121,634 | 2/1964 | Kichline et al. . |
| 3,164,413 | 1/1965 | Weber et al. . |
| 3,244,527 | 4/1966 | Baker et al. . |
| 3,246,336 | 4/1966 | Baribo et al. . |
| 3,420,672 | 1/1969 | Appleman . |
| 3,464,824 | 9/1969 | Jensen et al. . |
| 3,505,073 | 4/1970 | Bode . |
| 3,720,522 | 3/1973 | Nakagami ..................... 426/120 |
| 3,794,740 | 2/1974 | Achorn et al. ................. 426/71 |
| 3,895,117 | 7/1975 | Backlund ....................... 426/69 |
| 3,901,976 | 8/1975 | Roth et al. ..................... 426/74 |
| 3,962,484 | 6/1976 | Grosso ........................... 426/74 |
| 3,988,483 | 10/1976 | Deyoe et al. ................... 423/53 |
| 4,016,296 | 4/1977 | DeSantis . |
| 4,027,043 | 5/1977 | Schroeder et al. ............. 426/807 |
| 4,055,667 | 10/1977 | Linton et al. ................... 426/62 |
| 4,061,728 | 12/1977 | Graham et al. . |
| 4,062,988 | 12/1977 | DeSantis . |
| 4,160,041 | 7/1979 | Schroeder et al. ............. 426/807 |
| 4,171,385 | 10/1979 | Skoch et al. . |
| 4,171,386 | 10/1979 | Skoch et al. . |
| 4,219,572 | 8/1980 | Jackman ......................... 426/69 |
| 4,221,818 | 9/1980 | Schroeder . |
| 4,234,608 | 11/1980 | Linehan ......................... 426/74 |
| 4,265,916 | 5/1981 | Skoch et al. . |
| 4,376,790 | 3/1983 | Ames .............................. 426/2 |
| 4,382,966 | 5/1983 | Mickus et al. ................. 426/69 |

FOREIGN PATENT DOCUMENTS

| | | |
|---|---|---|
| 263695 | 6/1964 | Australia . |
| 438073 | 1/1972 | Australia . |
| 460390 | 8/1973 | Australia . |

OTHER PUBLICATIONS

"Calcium Chloride in Liquid Feed Supplements," Silvano Grosso et al., Dow Chemical U.S.A., NFLA Counter '73, Oct. 1973, pp. 115–129.

"Dehydration of Molasses", by Takeshi Miki et al., Chemical Abstracts, vol. 70, 1969, p. 104 (79348W).

R. B. Keyser, C. H. Noller, L. J. Wheeler, D. M. Schae-
(List continued on next page.)

*Primary Examiner*—R. B. Penland
*Attorney, Agent, or Firm*—Gregory F. Wirzbicki; Shlomo R. Frieman

[57] ABSTRACT

An acidic molasses-based liquid animal feed supplement stock including calcium and magnesium, so that the calcium to magnesium weight ratio is between about 1.5 and 3, and, optionally, non-protein nitrogen, is hardened into a solid form by the addition of a phosphorus-containing compound in a nutritionally appropriate amount. In a preferred embodiment a single homogeneous first solution containing the sugar or molasses and the soluble calcium and magnesium compound but containing no added phosphorus compound is prepared and stored until it is desired to manufacture the animal feed blocks. At that time a second solution containing phosphorus but no calcium, magnesium, or molasses is added to the first solution so that the blocking reaction can occur.

20 Claims, 6 Drawing Sheets

OTHER PUBLICATIONS fer, "Characterization of Limestones and Their Effects in Vitro and In Vivo in Dairy Cattle," *Journal of Dairy Science*, vol. 68, pp. 1376–1389 (1985).

A. M. Kovacik, S. C. Loerch, B. A. Dehority, "Effect of Supplemental Sodium Bicarbonate on Nutrient Digestibilities and Ruminal pH Measured Continuously," *Journal of Animal Science*, vol. 62, pp. 226–234 (1986).

M. Poos-Floyd, "Evaluation of Sodium Sesquicarbonate vs Sodium Bicarbonate for Dairy Cows Fed Corn Silage Based Diets in Early Lactation," University of Massachusetts, Amherst, Mass., Nov. 14, 1984.

Brochure from FMC Corporation, Philadelphia, PA, "Introducing a New Dairy Feed Buffer: S-Carb TM Feed Additive," 1984.

Brochure from Combustion Engineering, Inc., Cleveland, OH, "A Dairy Ration Necessity," describing MA-GOX® magnesium oxide.

C. L. Davis, "The Use of Buffers in the Rations of Lactating Dairy Cows," paper presented at symposium, Regulation of Acid–Base Balance, Tucson, AZ, Nov. 8–9, 1978.

R. S. Emery, "High Energy Feeds for Milk Production," paper presented at Symposium Buffers in Ruminant Physiology and Metabolism, Tucson, AZ, Oct. 23–24, 1975.

K. A. Cummins and R. W. Russel, "Effects of Feeding Whole Cottonseed to Lactating Cows on Glucose and Palmitate Metabolism," *Journal of Dairy Science*, vol. 68, pp. 2009–2015 (1985).

Brochure from Eastman Kodak Company, Kingsport, TN, "Eastman IsoPlus TM Nutritional Supplement," 1984.

A. M. Papas, S. R. Ames, R. M. Cook, C. J. Sniffen, C. E. Polan, L. Chase, "Production Responses of Dairy Cows Fed Diets Supplemented with Ammonium Salts of ISO C-4 and C-5 Acids," *Journal of Dairy Science*, vol. 67, pp. 276–293 (1984).

Hawley, "The Condensed Chemical Dictionary," Van Nostrand Reinhold Co., 10th Edition, pp. 185, 392, 633, 934–936 and 951.

Chen, "Cane Sugar Handbook", Eleventh Edition Wiley Interscience Publishers (1985), pp. 434–437 & 448–451.

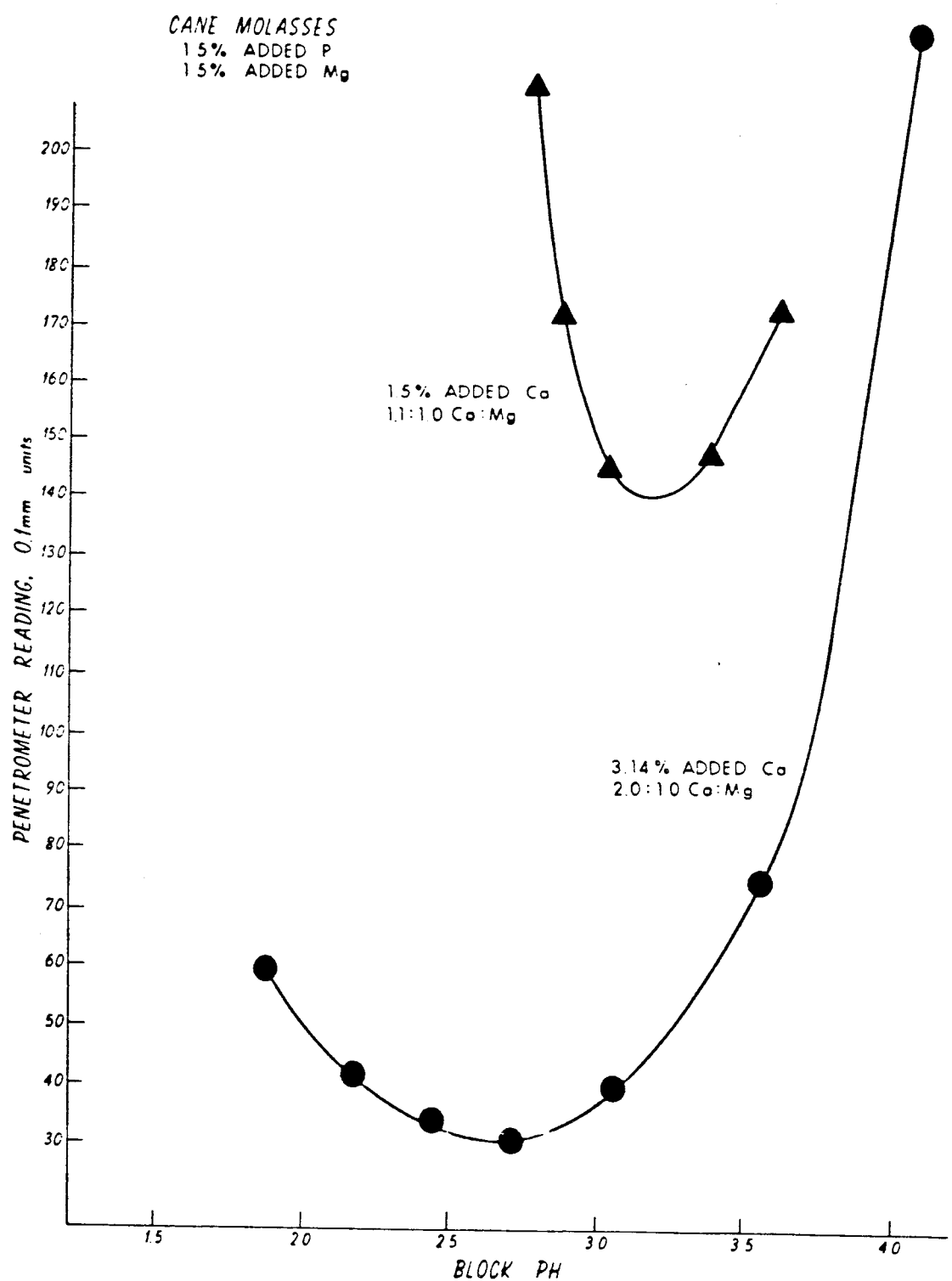

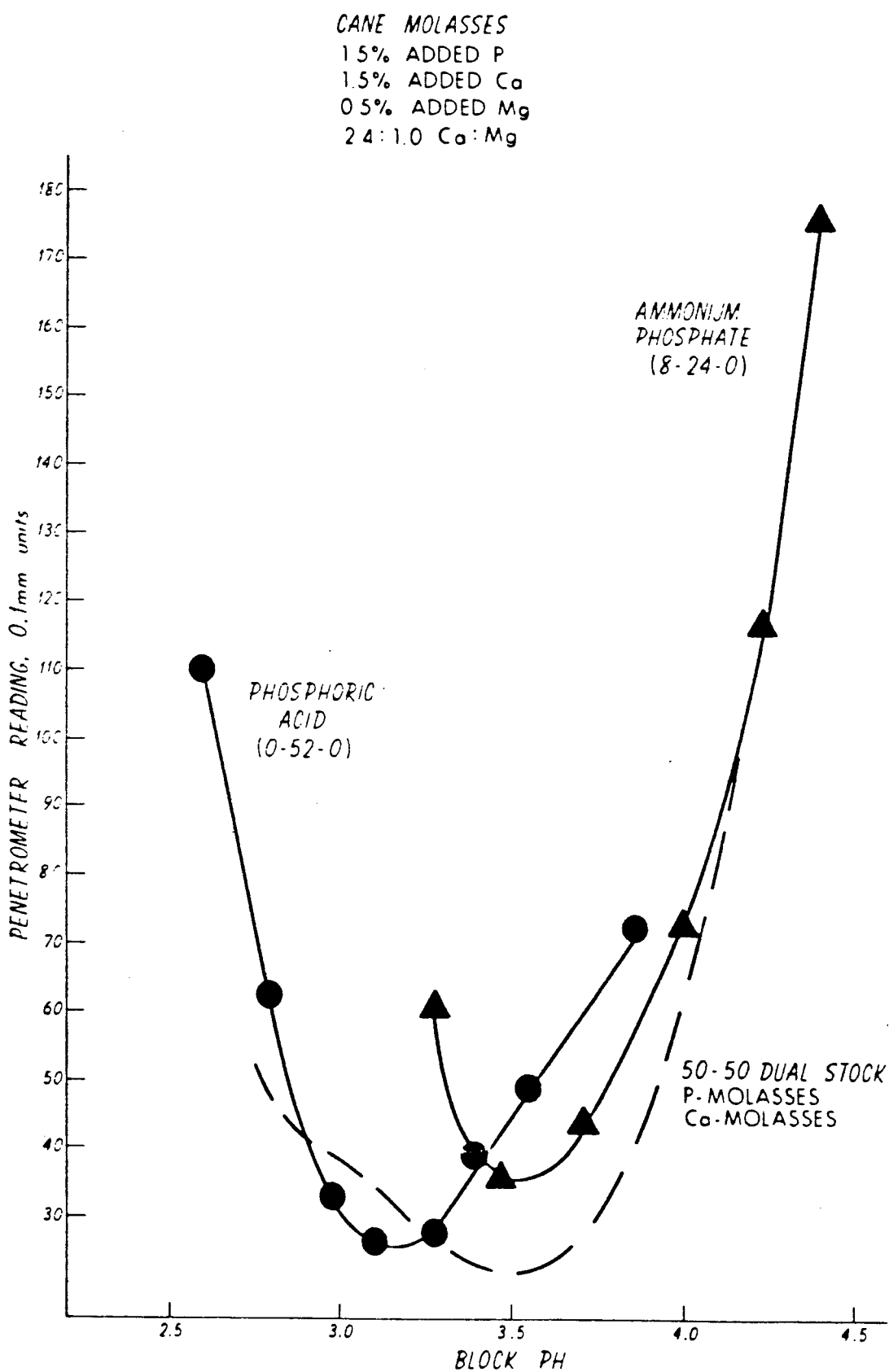

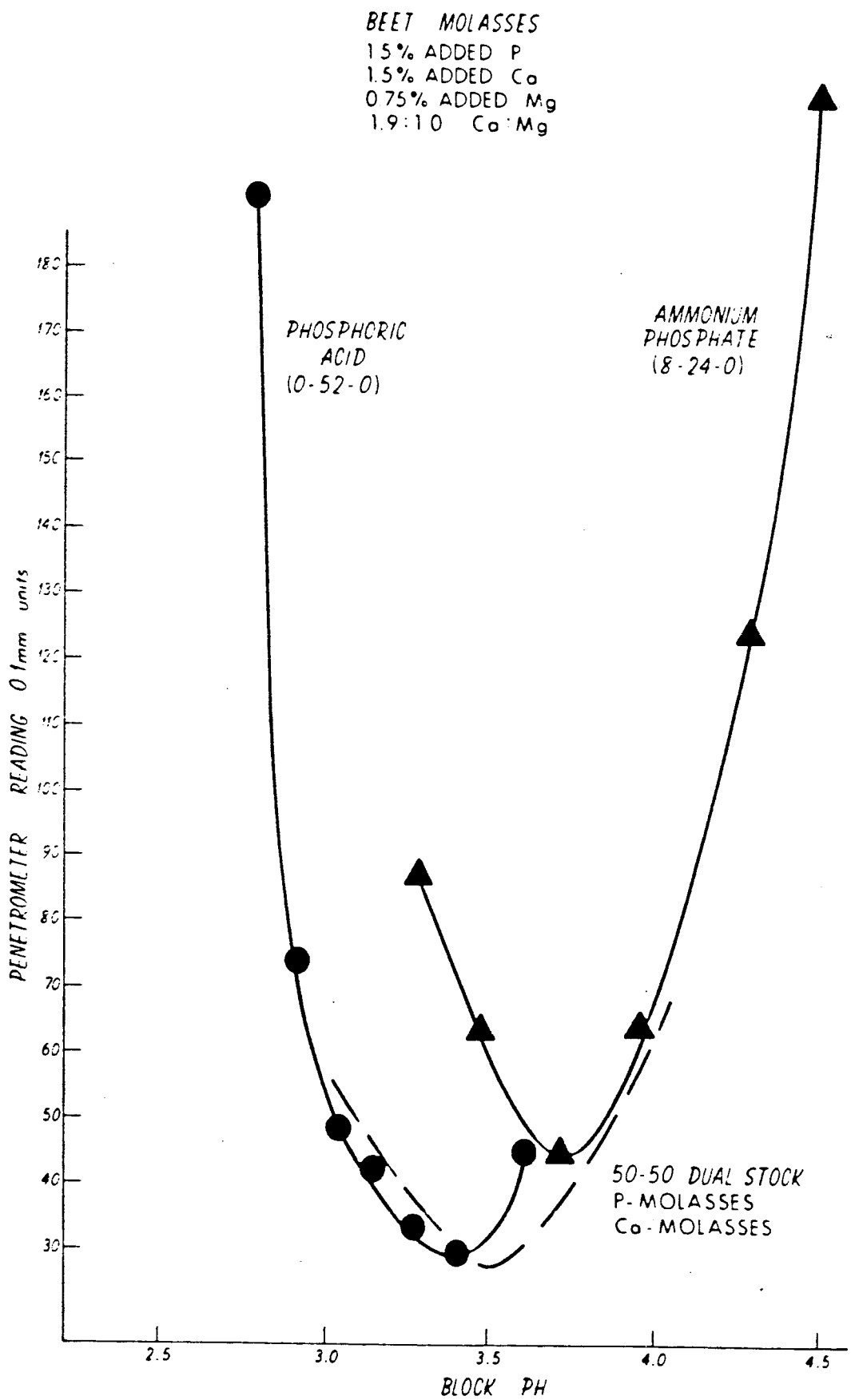

AQUEOUS SOLUTION FOR USE IN PRODUCING A SOLID ANIMAL FEED SUPPLEMENT

CROSS-REFERENCE TO RELATED APPLICATIONS

This application is a continuation of U.S. patent application Ser. No. 07/271,599, filed Nov. 15, 1988, now abandoned which is a continuation-in-part of U.S. patent application Ser. No. 876,993, filed June 19, 1986, now U.S. Pat. No. 4,800,092, which is a continuation-in-part of U.S. patent application Ser. No. 828,149, filed Feb. 7, 1986 now U.S. Pat. No. 4,798,727, all the above applications and patents being incorporated herein by reference.

BACKGROUND OF THE INVENTION

This invention relates to a method for making an animal feed supplement and, in particular, a molasses-based animal feed supplement in solid, block form.

The value of molasses-containing supplements as a palatable carbohydrate source and nutrient vehicle in animal diets has been recognized for many years. Phosphoric acid has often been added to the molasses supplement to serve as an acidic preservative and as a source of dietary phosphorus. Urea has been added to animal feed supplements to supply non-protein nitrogen, and fats and vitamins have also been included as ingredients in animal feed supplements. Molasses-based feed supplements are particularly valuable fed either "free-choice" to grazing cattle or to stock in confinement where feed mixing facilities are lacking. (Free-choice feeding allows the animal to consume from a conveniently placed reservoir of liquid or solid supplement according to need.) Consumption during free-choice feeding is controlled by use of a lick wheel with liquids or by varying the hardness of a feed block, both means limiting the animal's ease of feeding. Controlling palatability of the feed block by chemical means also limits consumption.

Solid animal feed supplements have been prepared from molasses and other ingredients to augment the dietary requirements of animals, especially cattle, when forage is scarce or of low quality, for example, during the summer months in California and summer through winter in the Pacific Northwest. Solid feed blocks offer the advantage of free choice feeding of cattle, thereby reducing the labor and expense otherwise incurred to mix the feed supplement with the cattle's feed ration. Molasses blocks have been manufactured by compressing ingredients into a molded shape or by evaporative heating of the ingredients. Both of these methods have certain disadvantages. For example, energy-supplying ingredients, such as molasses, and heat-sensitive vitamins (if added) may degrade during heating to the temperature necessary to evaporate water.

Additional dietary requirements develop during the seasonal periods when grasses are growing rapidly, usually in the spring of the year. During these periods, the magnesium content of grazing grasses is so low that a condition of hypomagnesemia, commonly known as "grass tetany," often develops in grazing herds. The condition manifests itself in the animal staggering or going into convulsions, and hypomagnesemia can even cause death in severe cases. The situation is worsened if a high nitrogen or potassium-content fertilizer is applied to the grassland to encourage plant growth since uptake of magnesium from the soil is thereby depressed.

To counteract the nutritional effects upon grazing herds of grasses with low magnesium content, animal feed supplements in the form of a liquid or a solid block containing molasses and a concentration of magnesium additive sufficient to overcome dietary deficiencies of the nutrient have been provided. Animal feed blocks containing molasses and magnesium as a nutritional supplement have been disclosed in U.S. Pat. No. 4,234,608 to Linehan wherein magnesium oxide and dicalcium phosphate are reacted in molasses-containing solution to form a solid feed block. U.S. Pat. Nos. 4,171,385, 4,171,386 and 4,265,916 to Skoch, et al. also incorporate magnesium oxide as a nutritional source with or without the use of ferrous sulfate as an additional blocking agent to form a moldable mixture. However, magnesium oxide is highly alkaline and only sparingly soluble in molasses so that mixing of solutions containing magnesium oxide to maintain uniform dispersion requires great expenditures of energy. Moreover, magnesium oxide, because of its sparing solubility in molasses solutions, reacts slowly with phosphate so that gelation requires at least one hour and more commonly several hours.

As magnesium oxide is a highly basic substance, the animal feed supplements incorporating it as a source of magnesium ions are usually highly basic, having a pH in the range from about 9.5 to 11 pH units. A particular disadvantage of alkaline animal feed supplements containing nitrogen sources, such as urea, is that grazing animals tend to produce free ammonia from such feed during rumination. In a high pH environment, sufficient free ammonia can be produced from the nitrogen source in the rumen of the animal to cause ammonia poisoning leading to death.

In U.S. Pat. No. 4,027,043, animal feed supplements are disclosed which are prepared by mixing a phosphate source and an aluminum or an alkaline earth metal ingredient with molasses to solidify the resultant mixture at an acidic pH. This patent discloses that the combination of a soluble phosphate or phosphoric acid, at from 0.5 to 5 weight percent $P_2O_5$, and an oxide or salt of aluminum, magnesium, calcium or mixture thereof, at from 0.5 to about 5 weight percent (expressed as the oxide) will solidify molasses.

The use of calcium chloride in liquid molasses-based supplements for cattle and its effect upon solidification has been investigated by Grosso and Nelson. (See "Calcium Chloride in Liquid Feed Supplements" reported in complete texts of the speeches given at the 1973 annual convention, NFIA-COUNTER '73, Oct. 14-16, 1973, Louisville, Ky.) The object of these investigators was to provide liquid supplements with high soluble calcium content and avoid solidification; nevertheless, some of the formulations they prepared did solidify. The formulations that did solidify generally did not have a nutritionally appropriate amount of phosphorus, that is, they contained either too much or too little phosphorus and they contained no magnesium additive. Certain of the other formulations that had nutritionally appropriate amounts of phosphorus did not harden since the phosphorus was supplied as a polyphosphate. (It has been found in the present invention that polyphosphate does not interact with calcium ions at acidic pH to provide a solid product at nutritionally appropriate levels of calcium and phosphorus concentrations, or at convenient temperature and mixing conditions. In addition, when soluble salts of magnesium are introduced into molasses feed supplements at nutritional levels, the mixture will not gel at acidic pH to satisfactory hardness.)

One major problem in the making of animal feed blocks results from the desire to transport and store the feed supplement as a liquid, so that solid blocks can be made from the liquid at remote locations and/or in small lots as the need arises. Sometimes it is more convenient to transport liquid solutions of molasses-containing feed supplements to remote blocking sites for storage than to transport and store molasses blocks. If the blocks can be rapidly and easily solidified on demand from liquid at remote sites, blocks can be manufactured from the liquid solution at will on site to meet the immediate nutritional requirements of the herd by incorporating extra vitamins, medicaments, and the like. However, to accomplish this goal, the nutritional and blocking agents added to molasses, especially the phosphorus, magnesium and calcium, must be substantially soluble in molasses or aqueous solutions. Molasses solutions prepared with less soluble ingredients, such as magnesium oxide, rapidly separate upon standing with the result that the solutions require constant stirring with power mixers before molasses blocks can be made. Therefore, when it is more convenient to manufacture blocks from stored solutions as needed or to meet the varying needs of the herd for vitamins, and the like, it is desirable to have a method of rapidly and easily preparing such solid feed blocks from substantially homogeneous liquid solutions that gel rapidly.

In addition, it is also desirable to have a method for preparing acidic solid, molasses-based animal feed supplements having nutritionally beneficial contents of phosphorus, magnesium and nitrogen which solidify rapidly when the ingredients are mixed at convenient temperature and which do not subject grazing herds to ammonia poisoning, but do counter the effects of hypomagnesemia during seasons of rapidly growing grasses.

SUMMARY OF THE INVENTION

An acidic feed supplement block is provided, the block being formed from reaction of an acidic liquid mixture comprising (a) a sugar-containing source, such as molasses, (b) an orthophosphate source or precursor, (c) magnesium, and (d) sufficient calcium to provide a total calcium to magnesium weight ratio between about 1.5 and 3.

Two methods are provided for making the acidic feed supplement block, called the "dual stock" and "single stock" methods. The "single stock" method is a specific embodiment of the "dual stock" method.

In the "dual stock" method, the solid feed supplement is provided by a method wherein (1) a liquid molasses mixture having an acidic pH is formed by mixing two solutions, at least one of which contains molasses or other sugar-containing source, with the first solution containing a phosphorus compound, preferably orthophosphoric acid, and the second solution containing a sufficient amount of calcium to react with the phosphate compound in the presence of magnesium so as to form a solid block, and (2) the liquid mixture is allowed to cure and then is recovered as a solid-molasses-based feed supplement.

In the preferred embodiment, the "single stock" method, the solid feed supplement is provided by a method wherein (1) a first single stock liquid molasses solution, said solution being either acid or basic, is formed containing molasses or other sugar-containing source, magnesium, and a sufficient amount of calcium to react with a post added second solution containing a phosphorus compound to form a solid animal feed block, (2) an acidic liquid mixture having a pH between 1.5 and 3.75 is formed under conditions of agitation by combining the first solution with the second solution, and (3) the liquid mixture is allowed to cure and then is recovered as a solid-molasses-based feed supplement. If the second solution contains an acidic phosphorus compound such as phosphoric acid, the first solution is adjusted to be basic and if a neutral or basic phosphorus compound such as ammonium phosphate is used, the first solution is adjusted to be acidic, so as to initiate the blocking reaction. The second solution is most preferably a commercially available phosphate solution of the type used as fertilizer, although any water-soluble phosphate source may be used.

In all embodiments of the invention, to solidify the block, the weight ratio of total calcium to magnesium in the liquid mixture is preferably standardized to between about 1.5 and 3 by analytically determining the native content of magnesium and calcium in the molasses, which can differ greatly depending upon the source of the molasses, and adding sufficient additional calcium and magnesium to achieve the desired weight ratio.

BRIEF DESCRIPTION OF THE DRAWING FIGURES

FIG. 1 shows the variation in block hardness with pH for cane molasses blocks containing various amounts of added magnesium, FIG. 2 shows the variation in block hardness with pH for beet molasses formulations containing various amounts of added magnesium, FIG. 3 shows the variation in block hardening with pH for molasses of low native magnesium content at various total weight ratios of calcium to magnesium, FIG. 4 shows the variation of block hardness with pH at different total weight ratios of calcium to magnesium.

FIG. 5 compares the variation of block hardness with pH for blocks made by the single acidic stock, the single basic stock and the dual stock method using cane molasses.

FIG. 6 compares the variation of block hardness with pH for blocks made by the single acidic stock, the single basic stock, and the dual stock method using beet molasses.

DETAILED DESCRIPTION OF THE INVENTION

Figure 1:
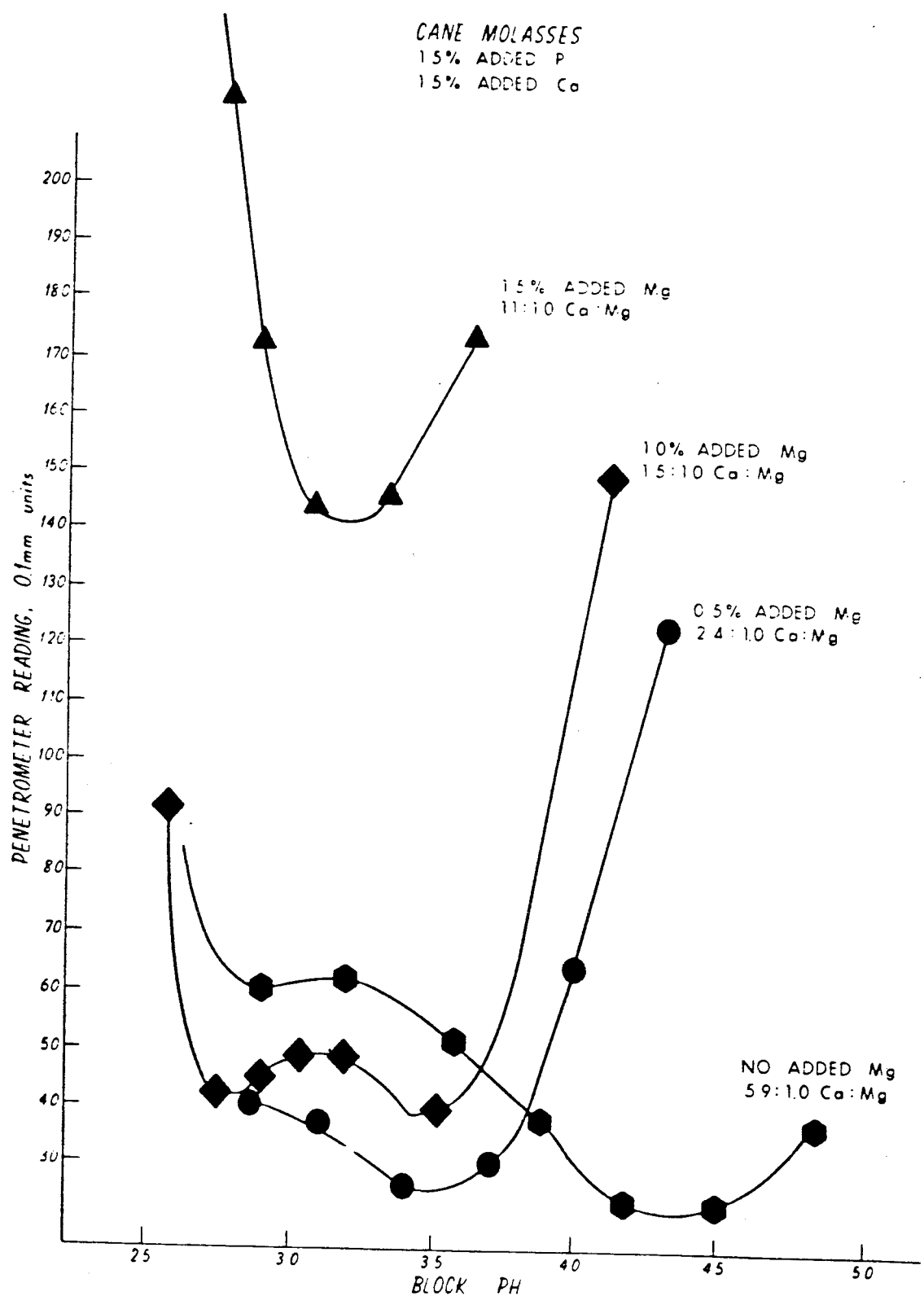
Figure 2:
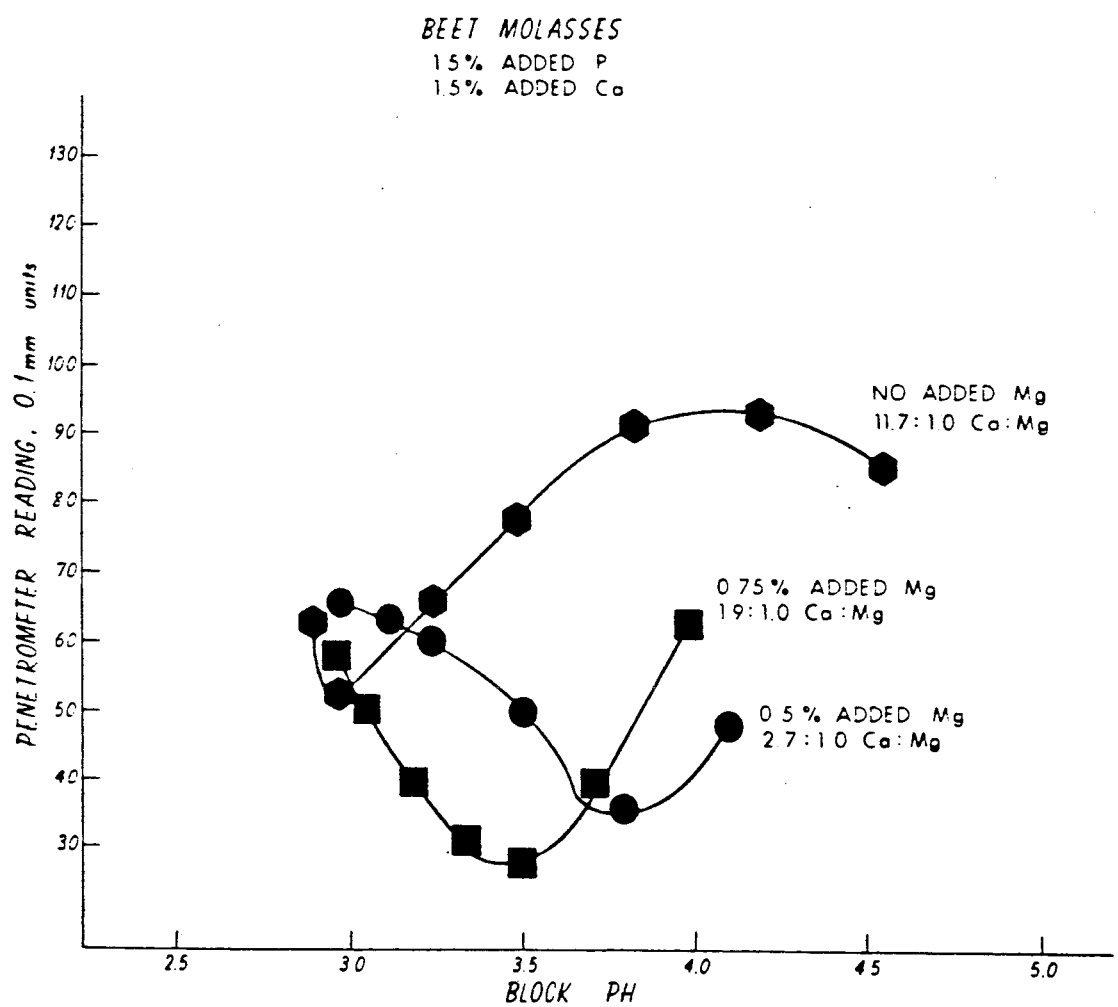

Acidic feed supplement blocks are considered advantageous for controlling the amount of the supplement consumed by free-choice feeding grazing animals. Overconsumption of blocks is both expensive and potentially harmful to the animals, particularly in the case of alkaline blocks. Acidic feed blocks minimize the potential harm to the herd caused by overconsumption of the feed supplement due to preference for the taste of alkaline feed blocks. Acidic feed supplement blocks possess an additional advantage over alkaline blocks if a non-protein nitrogen source, such as urea, is included as a nutrient. In alkaline conditions, such nitrogen sources produce free ammonia in the rumen of the grazing animal during rumination. Free ammonia is readily absorbed into the animal's bloodstream and may cause toxic symptoms or even death, if excessive. Finally, low block pH functions as a preservative, fly-repellant, intake control agent and is a pH modifying agent for ammonia produced during urea digestion by ruminant animals.

Producing acidic feed supplement blocks has proven surprisingly difficult, especially if concentrations of magnesium greater than about 1.0 weight percent are present. Due to the chemical similarity between magnesium and calcium, the latter of which is routinely used to harden molasses blocks, it would seem that magnesium could readily substitute for calcium as a blocking agent. But it was discovered in this invention that magnesium will not promote the proper blocking (or curing) reactions under acidic pH conditions, particularly of pH values below 4.0. However, in acidic feed blocks containing the usual concentration of calcium as a blocking agent, that is, between about 1 and 2 weight percent of calcium, it was surprisingly found that providing up to about 0.5 to 1.0 weight percent of magnesium produces a block having superior hardness and water resistance at low pH.

It is yet another discovery in the invention that, in a calcium-hardened block, addition of sufficient magnesium to meet the usual requirements for magnesium as a nutritional supplement, that is, between about 1 and 2 weight percent of magnesium, destroys the hardness of the block at acidic pH. However, it was most surprisingly discovered that this problem could be overcome by adjusting the calcium content so as to provide a calcium to magnesium weight ratio between about 1.5 and about 3.0.

Accordingly, the invention herein resides in the discovery that acidic molasses feed supplement blocks of superior hardness and reduced hardening time can be made by adjusting the weight percent ratio of total calcium to magnesium to fall within the range between about 1.5 and 3.0. Within this ratio range, acidic blocks of superior hardness and water resistance can be made that contain magnesium in concentrations ranging from the small amounts needed to impart heretofore unsuspected synergistic blocking properties to a molasses mixture to the greater amounts needed to meet nutritional requirements for a magnesium feed supplement.

The present invention is most particularly directed to magnesium-containing, acidic, molasses-based animal feed supplement blocks having sufficient water resistance and hardness to render handling convenient, usually a hardness of less than 80 penetrometer units as measured by a standard grease cone penetrometer (Precision Scientific Co.). The penetrometer reading units are in 0.1 millimeter increments of block penetration. The smaller the readings, the harder the block. Preferably the feed supplement block contains nutritionally beneficial amounts of phosphorus and magnesium and, optionally, non-protein nitrogen. Further, in the "dual stock" method, the invention resides in a method for making the acidic molasses-based feed supplement block by reacting two stock solutions under conditions of agitation. At least one of the stock solutions contains molasses, but the first solution contains the phosphorus and the second solution contains the calcium. The other ingredients, including magnesium, are dissolved in either or both of the solutions but preferably the magnesium is divided, although not necessarily equally divided, between the two solutions for improved solubility. In particular, care should be taken to prevent supersaturation of either solution with salts.

In the preferred embodiment, the "single stock" method, the ingredients are not divided into two stock solutions, but are dissolved into a single stock solution, except that no phosphorus is added to the solution. The single stock solution can be conveniently stored without significantly altering the blocking characteristics of the solution at temperatures up to 105° F. or higher, and for up to 30 days, or longer, and without appreciable thickening or settling out of ingredients. In this embodiment of the invention, when it is desired to form hardened feed supplement blocks, a second phosphate-containing solution, preferably a commercially available phosphate solution such as those used for fertilizers, can be used to supply the needed nutritional amounts of phosphorus and/or to initiate the blocking reaction in the single stock molasses solution. If it is desired to utilize an acidic phosphorus source, such as phosphoric acid, the single stock molasses solution is formulated to have a higher pH than is desired in the final supplement block, usually a basic pH, such that when the requisite amount of the acidic phosphate solution is mixed into the single stock solution, a liquid mixture will result having a pH within the desired range for the supplement block. Similarly, if it is convenient to use a commonly available phosphorus source having a neutral or basic pH, such as ammonium phosphate, the single stock molasses solution can be formulated to have a lower acidic pH than is desired in the final supplement block so that post addition of the phosphate solution will result in a liquid mixture having a pH within the range desired for the feed supplement block. Although it is possible to dissolve nutritional additives into the phosphate solution, for example, nitrogen compounds such as urea, all of the co-gellant additives containing added calcium and magnesium should be dissolved in the single stock molasses solution and not added to the second phosphate solution.

Differences in the gelling of molasses by type and source of the molasses, such as cane molasses from Hawaii and Central America or beet molasses from California and Idaho, can be explained largely by differences in the native content of magnesium and calcium. A wide-ranging survey of sources of cane and beet molasses indicates that native content of calcium and magnesium may each vary between about 0 and 1 weight percent depending upon the location of the source. Lot-to-lot uniformity within a single source appears to be relatively stable. Generally speaking, it has been discovered in the present invention that the ultimate hardness depends upon the total weight ratio of calcium to magnesium. Therefore, in accordance with the invention, the gelling or blocking responses at acidic pH among various strains of molasses can be standardized (or controlled) by adding sufficient calcium and/or magnesium to molasses to bring the total weight ratio of calcium to magnesium in the molasses into the range between about 1.5 to 3.0 which has been found to be critical for hardening at low pH values.

One major problem is encountered in making a feed supplement block containing enough magnesium to counteract the effects of "grass tetany." In the formation of the solid animal feed supplement, it has been unexpectedly found that, while calcium ions interact with phosphate ions to produce gelling of the supplement sufficient to form a stable block, the introduction of magnesium ions into the feed supplement can interfere with the calcium-phosphate blocking reaction sufficiently to make formation of solid feed blocks containing this nutritional additive difficult. It is believed that a competition between calcium and magnesium ions for the available phosphate ions destroys or weakens the blocking reaction. This difficulty, whatever its cause, is overcome and a molasses feed block of predictable hardness can be attained when the total weight ratio of calcium to magnesium in the liquid molasses mixture from which feed supplement blocks are made is standardized (or controlled) to fall within the range between about 1.5 and 3, preferably between about 1.75 and 2.25. By standardizing the weight ratio of calcium to magnesium, a block having a hardness of less than 80 in 0.1 millimeter penetrometer units, i.e. 0.1 mm = 1 unit, and containing any desired concentration of magnesium or calcium within the limits of solubility in the molasses used can be obtained. (As used herein the total weight ratio includes both the native and the added magnesium and calcium in the liquid reaction mixture.)

In the "dual stock" method of the present invention, the ingredients of the animal feed supplement are divided between two liquid stock solutions such that, when mixed together, a liquid mixture is provided containing all the desired ingredients of the feed supplement block having a pH below about 4.0 and a calcium to magnesium ratio between about 1.5 and about 3.0. At acidic pH within this range the resultant feed block has a hardness in the desired range, i.e., below about 80 millimeters, and preferably below about 50, and most preferably below about 30 penetrometer units, and the thickening liquid mixture has a viscosity similar to that of thick cream so that it can be readily stirred. Moreover, the gelation reaction proceeds rapidly in this acidic pH range.

In the embodiment of the invention employing "dual stock" solutions, the desired ingredients for the animal feed block are dissolved in either or both of the liquid solutions, with one solution containing the phosphate ion and with the other solution containing the calcium in an amount sufficient to achieve the desired ratio of calcium to magnesium in the final reaction mixture. For convenience, it is usually preferred that the molasses be divided equally between the two liquid solutions to be mixed to form the reaction mixture. However, all the molasses can be introduced via the phosphorus-containing solution with the other solution being a brine containing the soluble calcium source. Or the calcium source can be dissolved in the molasses to comprise one solution while the phosphorus source is dissolved in a second, aqueous solution. Other ingredients of the animal feed supplement as taught herein, including magnesium, can be divided between the two solutions or incorporated totally into either solution as desired.

Because the ingredients of both the first and second solutions are readily soluble in aqueous media, including molasses, the solutions can be transported, stored as separate solutions, and readily mixed together at remote blocking locations as feed blocks are needed. Stored separately, the solutions will remain fresh for as long as about 7 to about 30 days, or longer. When it is desired to convert the two liquid solutions into a solid feed supplement, the two solutions are introduced into a common mixing vessel, such as a vat or even a mold of the shape desired for the final solid block, or can be blended in a continuous in-line mixing device.

In the preferred "single stock" embodiment, the ingredients of the animal feed supplement except for the phosphorus are contained within a single stock solution and a calcium to magnesium ratio between about 1.5 and about 3.0 such that, when mixed with either an acidic, a neutral or basic phosphorus source, a liquid mixture is provided having a pH below about 4.0. If desired, certain nutritional additives can be dissolved in the phosphate solution, such as nitrogen compounds, but no molasses or other sugar source and none of the co-gellant additives, such as calcium and magnesium compounds, should be contained in the phosphate solution. When it is desired to produce the solid feed supplement blocks, the single stock molasses solution is introduced into a mixing vessel or in-line blending device and the phosphate solution is mixed into the single stock molasses solution under conditions of agitation.

Using either the "dual stock" or the "single stock" method, the mixing procedure is the same. After moderate to mildly severe agitation for about 10 seconds to about 5 minutes, a substantially homogeneous colloidal gel forms that rapidly cures into a solid having the desired hardness if the pH of the mixture is maintained at a value below about 4.0 pH units. The mixture becomes viscous even during mixing and is firm to the touch within a few hours. Within 1 to 5 days, the mixture solidifies to a hardness of 80 or less (as determined by a standard grease cone penetrometer in units of 0.1 millimeter) at which hardness it is easily handled and transported. The mixture may be allowed to harden in the mixing container, for example, a cardboard drum, or may be poured into another suitable mold for hardening or curing into a cube or cylinder. Additional ingredients such as salt (NaCl); protein meals; non-protein nitrogen, such as, urea, biuret, ammonium salts; fat; vitamins; trace minerals; and medicaments and the like may be incorporated into the resulting solid, molasses-based animal feed supplement by adding such ingredients to the molasses solution prior to hardening.

When introduced to fulfill nutritional requirements, concentrations of ingredients in the final feed supplement usually include between 1 and 2 percent by weight of phosphorus and between 1 and 2 percent by weight of magnesium. Concentrations of calcium are usually determined by the requirements of the calcium to magnesium ratio as taught herein, but increasing the concentrations of both phosphorus and calcium within the range of from 1 to 2 percent will increase both the rate of hardening and the ultimate hardness of the molasses blocks so long as the weight ratio of the total calcium ion to the total magnesium ion in the reaction mixture (including the native calcium and magnesium in the molasses) remains within the critical 1.5 to 3.0 range. Therefore, the preferred concentrations of both calcium and phosphorus are within the range of 1.5 and 2.0 weight percent. At acidic pH less than 4.0, a ratio of calcium to magnesium below about 1.5 or above 3.0 will result in unsatisfactory gelation of the feed block. It is especially important to utilize the above preferred ranges of pH, ingredient concentrations, and calcium to magnesium ratios when the total solids content of the molasses-based animal feed supplement is low as when, for example, a low BRIX molasses, for example below about 75° BRIX, is utilized as the molasses source.

Molasses is commercially available as an aqueous solution having a solids content rated at about 60° to 90° BRIX and a consistency varying from a thin to a thick syrup. (Cane molasses is usually 80°–90° BRIX. Beet molasses is usually 75°–85° BRIX. Other molasses, e.g. wood and citrus, may be lower, about 60°–70° BRIX.) While molasses from different sources may differ in both the identity and amount of non-sugar and colloidal materials contained therein (such non-sugar and colloidal materials may coprecipitate or form solution aggregates with the calcium, magnesium, and phosphate gel and thereby affect the rate of hardening and the ultimate hardness), the molasses utilized in the method of the instant invention may be any sugar-containing molasses, such as cane or blackstrap molasses, beet molasses, corn molasses, wood sugar molasses, citrus molasses, and the like. Molasses having a solids concentration between about 60° and 90° BRIX can be used, but preferably, molasses of higher solids concentration, for example, from 75° to about 90° BRIX, is utilized since a higher solids content increases the ultimate hardness of the blocks or requires less phosphorus, magnesium, and calcium to obtain equivalent hardness. The most preferred molasses is cane or beet, since these are the most abundant molasses available in commerce. The method of this invention may also be used to solidify other aqueous sugar solutions, such as refined sugar syrups, although the lack of active non-sugar and colloidal material in such aqueous sugar solutions may make solidification less effective than with molasses.

The phosphate compound used may be any suitable feed-grade, water-soluble phosphate or phosphoric acid having a simple phosphate group, that is, an orthophosphate. Useful phosphoric acids include electric furnace (white) phosphoric acid, or defluorinated wet-process (green) phosphoric acid, which can be of any commercially available grade such as the commonly available concentration range of from 50 to about 55 weight percent expressed as $P_2O_5$ corresponding to a concentration of orthophosphoric acid of about 70 to 75 weight percent. Examples of water-soluble phosphates which can be used are ammonium or alkali metal phosphates, such as mono- or diammonium orthophosphate, monopotassium orthophosphate, etc. Monocalcium phosphate may also be used as a phosphorus source. Polyphosphoric acid can also be employed as a means to increase formula dry matter since it easily dissolves in molasses or in aqueous urea solutions or in any other aqueous solution to be added to the molasses, provided sufficient time is allowed at low pH for hydrolysis to orthophosphate. The most preferred source of phosphate is orthophosphoric acid since it is an easily handled, high assay liquid and is a readily available item of commerce.

Polyphosphates, i.e., compounds having more than one phosphate group condensed per molecule, have been found to hinder the rate of hardening and ultimate hardness of acidic molasses solutions; therefore, absence of polyphosphates is preferred. While not wishing to be bound by theory, it is believed that polyphosphate compounds sequester magnesium and calcium ions and render them useless for hardening the phosphorus-containing molasses solution. Similarly, other calcium and magnesium sequestrants, such as lactic and citric acid, should be avoided since they either sequester ions or compete with the hardening reaction of the calcium and magnesium ions and the ortho-phosphate compound. Since sequestrants will usually reduce the available calcium and magnesium in proportion to their presence in solution, sequestrants will usually have no effect upon the calcium to magnesium weight ratio of available ions. In addition precipitants for calcium and magnesium should be avoided, especially sulfate, which precipitates calcium ions. (Additional calcium and magnesium ions may be provided to compensate for those sequestered or precipitated; however, this is economically inefficient.)

In the preferred embodiment of the invention, for convenience commercially available phosphate solutions are post-added to a single stock molasses solution containing all the other co-gellant ingredients desired in the feed supplement block. Usually the phosphate solution contains phosphoric acid, preferably 0-52-0 (N-$P_2O_5$-$K_2O$) orthophosphoric acid, or an aqueous solution of ammonium phosphate, preferably the commonly available 8-24-0 (N-$P_2O_5$-$K_2O$) ammonium phosphate used in fertilizers. However, the phosphate solution can comprise any readily soluble phosphate salt, including those named above, such as sodium or potassium phosphate. Again, care should be taken to assure that the phosphate solution is not super-saturated with salts to avoid storage and handling problems. (The standard method for designating the content of fertilizers as used herein employs three or four numbers separated by dashes and enclosed within parentheses. The first number designates the concentration of nitrogen as nitrogen, the second number designates the concentration of phosphorus as phosphorus oxide ($P_2O_5$), the third number designates the concentration of potassium as potassium oxide ($K_2O$), and the fourth number, if it is employed, can designate the concentration of any desired component so long as it is clearly identified on the fertilizer package.)

As discussed above, the orthophosphate compound is added to the molasses in an amount sufficient to provide from 1 to 2 weight percent, preferably 1.5 to 2 weight percent of phosphorus (calculated as P) in the final solid product. Less than about 1 weight percent of phosphorus in the solid, molasses-based animal feed supplement is inadequate for a solid block formation and is marginal from a nutritional standpoint. Although phosphorus contents greater than about 2 weight percent may be used, such high concentrations may exceed nutritional requirements for cattle, at typical block consumption rates. Also, the hardness of the solid molasses blocks produced by the method of this invention is not increased appreciably by the excessive phosphorus. Therefore it is not appropriate from an economic standpoint to exceed 2 weight percent of phosphorus.

For best results the magnesium source is water soluble so that reaction with phosphate and soluble calcium during gelation proceeds substantially instantaneously. Therefore, magnesium compounds, such as magnesium oxide, insoluble in virtually all aqueous media, are unsuitable for use in the composition and method of this invention. Typically, magnesium chloride, as well as the magnesium salts of the lower molecular weight organic acids, for example, magnesium acetate and magnesium propionate, may be used, as well as other magnesium-enriched products, such as magnesium lignosulfonate and magnesium sulfate. However, sulfate inclusions should be limited to avoid depletion of soluble calcium. Of the above magnesium compounds, magnesium chloride is the most preferred since this source of magnesium ion is inexpensive and very soluble in water, aqueous urea solutions, and sugar syrups such as molasses. Mixtures of the above magnesium salts are also conveniently used. The amount of magnesium employed, including the native magnesium, is usually from about 0.5 to about 2 weight percent of the solid molasses block of this invention, expressed as magnesium, and preferably is from about 0.5 to 1 weight percent for nutritional purposes.

The calcium source is usually water soluble although compounds such as calcium oxide, which is soluble in molasses but not in typical aqueous media may be used in the invention. Preferably, calcium chloride, as well as the calcium salts of the lower molecular weight organic acids, for example, calcium acetate and calcium propionate, are used, as well as other calcium-enriched products, such as calcium lignosulfonate. However, calcium sulfate, due to its low solubility in aqueous solutions and in molasses, is not an effective calcium source. Of the above calcium compounds, calcium chloride is the most preferred since this source of calcium ion is inexpensive and very soluble in water, aqueous urea solutions, and sugar syrups such as molasses. Mixtures of the above calcium salts are also conveniently used. The amount of calcium employed depends upon the total amount of magnesium in the reaction mixture. Sufficient calcium is added so that the weight percent ratio of calcium to magnesium falls within the range between about 1.5 and about 3, preferably between about 1.75 and 2.25. Like the phosphorus content, the preferred calcium ion concentration, for rate of hardening and ultimate hardness, also depends on the total solids of the molasses-containing animal feed supplement.

It has been found that in the pH range below about 4.0 pH units maximum hardness for the solid molasses feed supplements of this invention is attained when the total ratio of calcium ion to magnesium ion per weight basis in the product feed block is between about 1.5 and 3, and preferably between about 1.75 and 2.25. Therefore, after determining by conventional analytical methods the native concentrations of magnesium and calcium in the molasses to be used, sufficient amounts of each are added so that the calcium and magnesium concentrations in the final reaction mixture (and resultant feed block composition) fall within the critical range of calcium to magnesium ratios necessary to promote rapid gelation and desirable hardness.

In the "dual stock" embodiment of the invention, the calcium solution may be added to the phosphorus-containing molasses as an aqueous solution or brine. Or calcium and magnesium may be added as components of any other aqueous liquor to be added to the phosphorus-containing molasses solution, for example, with the aqueous urea solution. With high shear input, calcium chloride and/or magnesium chloride might be incorporated in dry form, such as flakes. High shear is required to disintegrate and disperse the solid flakes. Preferably, for ease of mixing, the calcium and magnesium are predissolved in molasses.

For example, in the method employing a dual stock solution, a phosphorus-containing molasses solution is combined with a separate calcium-containing molasses solution. To form the first solution, ortho-phosphate is dissolved in a first molasses solution at a concentration higher than 2 percent by weight, and the excess phosphorus content is diluted to the correct concentration by mixture with a second, calcium-containing molasses solution. If, for example, equal volumes of the ortho-phosphate-containing molasses solution and the calcium-containing molasses solution are to be combined to provide a solid product, then from 2 to 4 percent, by weight, phosphorus is dissolved in the first molasses solution to yield a product containing 1 to 2 weight percent phosphorus. The magnesium source may be dissolved in either or both molasses solutions in the "dual stock".

The reaction mixture, that is, the mixture resulting from combining all the ingredients to be contained in the molasses block, should be at a pH value preferably less than about 4.0, more preferably less than 3.75, and most preferably between 1.5 and 3.75 pH units. A pH-modifying agent, either acidic or basic as needed, can be used to adjust the pH within the desired range, depending upon the nature of the phosphate source and the type and source of the molasses so that the pH of the final reaction mixture falls within the desired range. For example, if orthophosphoric acid is used as the phosphorus source, as in the preferred embodiment, a basic pH-modifying agent, either as an aqueous solution or anhydrous, can be used to adjust the pH. Ammonia can be used for partial neutralization of phosphoric acid, but calcium oxide is preferred in alkaline molasses stock solutions to avoid the objectionable odor of ammonia and the slow formation from ammonia of potentially toxic nitrogen heterocyclic compounds with sugars. Other water-soluble bases may be used, such as the alkali metal hydroxides, for example, sodium and potassium hydroxides. Ammonia may be desirable for its low cost and because it contributes to the protein equivalent of the resulting solid animal feed supplement by providing nitrogen that can be converted to amino acids by ruminant feeders. If an acidic pH modifying agent is required, hydrochloric and acetic acids are inexpensive to use and are, therefore, preferred, but any water-soluble hydrogen ion source can be used. However sulfuric acid is usually used sparingly to minimize the presence of sulfate in the reaction mixture.

The pH is measured after homogeneously combining all of the ingredients utilized in the solid molasses blocks of this invention. However, if the pH is to be adjusted with base, such adjustment is usually made in the phosphoric acid solution prior to blending with the calcium source. Adding base such as ammonia to a solution already containing both added calcium and phosphate ions produces an inferior solid, molasses-based animal feed supplement due to formation of precipitates at localized areas of high alkalinity prior to uniform dispersion of the alkaline ingredient. Therefore, if calcium chloride, either as a solid or as an aqueous solution is the source of calcium in the embodiment employing dual stock solutions, the pH of the phosphorus-containing solution is preferably adjusted to somewhat greater than the pH desired for the resulting reaction mixture so that, when ultimately combined with the calcium-containing solution, the desired pH is attained in the reaction mixture.

The optimum pH for any given molasses is the acidic pH at which the molasses feed supplement block achieves greatest hardness and varies only slightly from one molasses to another. Although molasses feed supplements containing the desired nutritional amounts of nitrogen, phosphorus and magnesium can be gelled at higher pH values beyond the acidic range, the supplement mixture becomes so viscous (the consistency of paste) at such elevated pH values that mixing requires factory scale equipment. In addition, the expense of energy and equipment required to stir a highly viscous liquid is uneconomical. In any event, where small scale mixing operations are contemplated, for example at remote blocking locations, operation in the pH range below 4.0 using the calcium to magnesium ratios required in this invention enables the use of small scale mixers capable of providing no more than moderate to mildly severe agitation to solutions of moderate non-Newtonian viscosity (the consistency of thick cream).

The result of nonuniform dispersion is a nonhomogeneous product which may have localized fluid and solid regions. But shearing agitation, as obtained with a Lightnin Mixer, is adequate to prepare small laboratory batches of the mixture of the two solutions; however, prolonged shearing or remixing after 15 to 30 minutes standing should be avoided since the gel formed by the interacting orthophosphate, magnesium, and calcium ions may be disrupted prior to setting into a hard product. Hand-mixing of small batches has even been found to be adequate if the calcium and magnesium are predissolved in a molasses solution. In general, mixing for 10 seconds to 5 minutes with a Lightnin Mixer or 1 minute to 5 minutes by hand is usually adequate to combine the phosphorus-magnesium molasses solution with a calcium-magnesium molasses solution so as to render a uniform gel that will cure into a solid product.

However, in the "dual stock" method, if the calcium is added as a brine, for example an aqueous solution containing 50 percent by weight of calcium chloride, more intense mixing may be required. It may be desirable to avoid the addition of water, particularly when using a high water content molasses to achieve increased hardness in the resulting solid molasses blocks. Thus, calcium chloride (or other source of calcium ion) might be added as a solid or a very concentrated solution. But in this embodiment, high shear mixing, as from a turbine or centrifugal pump or an in-line mixer, may be required. In a continuous operation an in-line mixer, for example, a high speed rotor, inside a flow-through tube is suitable when using any of the stock blending methods disclosed herein.

The solutions described above in both the dual and single stock methods may be mixed in the mold used to form the solid product of this invention or mixing can be done in a separate vessel or in-line blender and the mixture can be poured or otherwise introduced into molds. The mixture will thicken rapidly upon combining the two solutions so that at most within 30 minutes after the ingredients have been combined the mixture should be poured into forms selected to impart the desired solid block form. Any size molds can be used, but for ease of handling, molds providing solid blocks of from 30 to about 100 pounds, preferably from about 50 to about 55 pounds, can be used. But blocks as large as 500 pounds or greater can also be manufactured using this method. These blocks can be cylindrical, cubic, or any other suitable shape. In one embodiment, the thickening mixture is introduced into corrugated cardboard boxes which are closed, sealed, and stored for a sufficient time to permit the liquid to solidify or cure, typically for a period of 1 to about 5 days. After the blocks have cured, the resultant packages can be palletized, and the like, for shipment and storage.

While the inclusion of calcium to magnesium within the weight ratio between 1.5 and 3 has been found to accelerate the hardening rate, the temperature at which the above solutions are combined, as well as the temperature at which the resultant mixture is cured, also affects the hardening rate. In general, increasing temperature facilitates mixing and increases the curing rate. For example, it has been found that if the molasses blocks are cured at 40° F., maximum hardness is attained after about 2 weeks of curing, but when cured at 70° to 80° F., maximum hardness occurs after 2 to 3 days, and at 105° F. only about 1 day is required to attain maximum hardness. Preferably, the resulting mixture is agitated and subsequently cured at a temperature from 60° to 110° F., more preferably from about 75° to about 110° F. A higher temperature, within the above range, will provide benefits for the mixing step of this invention in two ways. First, the resulting decrease in the fluid viscosity of the mixture makes for better mixing. Second, the rate of hardening of the mixture is increased by increasing temperature. Particular advantage of the temperature effect in the mixing step can be taken by using solid anhydrous calcium and magnesium chlorides and/or other additives that provide a significant heat of solution, such as is created by acid-base reactions, to raise the temperature of the reaction mixture. Heat from acid-base reactions and other heats of solution are only of value if generated during blocking or when stocks are freshly made. To take advantage of these temperature effects in colder climates, one or both of the aqueous solutions can be preheated, and the liquid-containing molds can be stored in a heated area during the curing period. However, care should be taken to avoid temperatures in excess of about 110° F. since molasses decomposition reactions may ensue at temperatures above that point. (Increasing calcium and/or phosphorus within the calcium to magnesium ratio of 1.5 to 3 further accelerates hardening.)

The solid, molasses-based animal feed supplements prepared by the methods of this invention desirably include other nutritionally suitable ingredients. For example, fats and oils may be employed in the invention as a source of animal edible fat. Optionally, edible fats and oils from animal and vegetable sources (which can be liquids or solids at room temperature) can be included in the solid, molasses-based animal feed supplements of this invention. The solid compositions can contain from 2 to about 30, preferably from 5 to about 20, weight percent of edible fat. These fats include various fatty acids, such as stearic, palmitic, oleic, linoleic, and lauric, and the mono-, di-, or triglycerides of these fatty acids. Useful fats and oils can also include complex lipids, such as the phospholipids, for example, fatty acid esters of glycerol, phosphate or lecithins, which also contain nitrogen bases, such as choline. The fats are commonly identified by source and suitable fats which can be employed include the oils, tailings, or refining residues from the following sources: soybean oil, cottonseed oil, sesame oil, rapeseed oil, olive oil, corn oil, tallow, fish oil, coconut oil, and palm oil, and the like. Preferably, relatively inexpensive sources of fats are employed, such as yellow grease compositions, restaurant fats and greases, acidulated soap stocks or acidulated fats and oils. Such fats may also contain an antioxidant in an effective amount to inhibit oxidative degradation of the fat, for example, from 0.01 to about 1 weight percent of butylated hydroxyanisole, butylated hydroxytoluene, 4-hydroxy-methyl-2, or 6-di-tert butylphenol, among others.

An emulsifying agent can be included to stabilize the composition and prevent separation of the fat ingredient during storage of liquid solutions and manufacture of the product. Weeping of the fat ingredient from the solid block after its formation can also be prevented by employing an emulsifying agent at a concentration of from about 0 to about 2 weight percent. Preferred emulsifying agents are the colloidal clay gellants, for example, attapulgite, bentonite, and sepiolite, which also function to increase the hardness of the solid product of this invention.

The solid, molasses-based feed supplement of this invention also may contain a nonprotein nitrogen source, such as ammonia, urea, biuret or mono- or diammonium phosphate to supply a part of the nitrogen dietary requirements for ruminants. (Note that ammonia may also be used for pH adjustment and ammonium phosphate may provide orthophosphate. Thus, these sources of nonprotein nitrogen are dual functional.) The preferred nonprotein nitrogen source is urea, which can be added to provide a concentration from about 1 to about 15 weight percent, and preferably from about 5 to about 10 weight percent based on the solid, molasses-based feed supplement of this invention. Generally, the feed supplement will contain no more than about 40 weight percent equivalent protein content from a nonprotein nitrogen source. Since the molasses also contributes from 1 to about 3 weight percent of utilizable nitrogen, the maximum amount of urea or other nonprotein nitrogen source may be reduced by the amount of nitrogen contributed by the molasses.

Various trace nutrients, drugs, and vitamins can also be incorporated in the solid, molasses-based animal feed supplements of this invention, including vitamins A, D, and E, tocopherols, as well as anti-oxidants for these materials, such as ethoxyquin (1, 2-dihydro-6-ethoxy-2, 2,4-trimethyl quinoline). Appropriate medicaments may be incorporated on an "as-needed" basis. The quantity and concentration of these medicaments must, of course, be in accord with established FDA regulations governing their use.

The following table sets forth the typical concentrations of ingredients for the compositions of the invention:

TABLE I

| COMPONENT | CONCENTRATION (Wt. %) |
| --- | --- |
| 1. Molasses | 60–87 |
| 2. Fat | 0–30 |
| 3. Orthophosphate (as P) | 1–2 |
| 4. Calcium (as Ca) | at about 0.75–6 (as required for optimum Ca/Mg ratio) |
| 5. Magnesium as (Mg) | 0.5–2 |
| 6. Emulsifier | 0–2 |
| 7. Starch, clay or other thickeners or gellants | 0–2 |
| 8. Equivalent Protein derived from non-protein nitrogen sources | 0–40 |
| 9. Trace Minerals, vitamins | 0–1 |
| 10. Salt (NaCl or KCl) | 0–10 |
| 11. Medicaments | (as approved) |
| 12. Basic or Acidic Materials | (as required) for pH adjustment |

In both the "dual stock" and "single stock" embodiments of the invention, the above ingredients are preferably combined with molasses or with either of the aqueous solutions so that the final reaction mixture falls within the desired pH range.

The invention is further illustrated by the following examples which describe specific modes of practicing the invention and are not intended as limiting the scope of the appended claims. Unless stated otherwise, the ingredients are in gram units and the percents are weight percents. Where a solution is referred to, it is understood that the solution is aqueous.

EXAMPLES 1 AND 2

To compare the hardness characteristics of typical molasses block compositions containing varying amounts of magnesium, two molasses block systems were studied, one using cane molasses and one using beet molasses. In each molasses block system, the formulation contained about 70 weight percent molasses, 1.5 weight percent of phosphorus from orthophosphoric acid, 1.5 weight percent of calcium from calcium chloride, 20 weight percent of protein equivalent from urea (and ammonia used to adjust pH), and to 5 weight percent of sodium chloride along with sufficient magnesium chloride to provide magnesium in zero, 0.5, 1.0 and 1.5 weight percent concentrations in the cane molasses system and zero, 0.5 and 0.75 in the beet molasses system.

Equal weight portions of the calcium-molasses and phosphorus-molasses stock solutions (shown in Table 2) were blended using a Lightnin mixer to maximize colloidal dispersion of the reacted ingredients. The mixture was poured into 200 gram molds and cured for two days at 105° F. followed by one day at room temperature. Hardness values were measured using a Precision standard grease cone penetrometer having a cone weight of 102.5 grams. The units of the penetrometer readings are in 0.1 millimeter increments of penetration into the molasses block by the tip of the penetrometer's cone. The same method of mixing, curing, and measuring hardness is used throughout the Examples herein.

Formulations used in Example 1, the cane molasses system, are summarized in Table 2 for the 0.5 weight percent added magnesium level. As shown in FIG. 1 for this cane molasses system containing 1.5 weight percent of calcium, the optimum hardness of less than 30 units occurs at a pH of about 3.5 when the total calcium to magnesium ratio is 2.4. Hardness of about 40 units is also achieved at a pH slightly less than 3.5 with a calcium to magnesium weight ratio of about 1.5. Hardness falls off sharply when the calcium to magnesium weight ratio is 1.1, which lies outside the required range of 1.5 to 3.

By contrast, the formulation containing no added magnesium achieves maximum hardness at a pH between 4.0 and 4.5. In this pH range the reaction mixture has the consistency of paste and requires expensive mixing equipment to prepare so that preparation of feed supplement blocks at remote sites is thereby rendered impracticable. In addition, it should be noted that, although this formulation achieves the requisite hardness, it contains no added magnesium. The native calcium and magnesium contents of the cane molasses used here are 0.63% Ca and 0.44% Mg.

TABLE 2

| FORMULATION FOR EXAMPLE 1 | | |
| --- | --- | --- |
| | P Stock Wt. % | Ca Stock Wt. % |
| 50% Urea Solution | 11.0 | 11.0 |
| Phosphoric Acid (23.8% P) | 12.6 | — |
| Cane Molasses (84° BRIX) | 70.6 | 70.9 |
| Calcium Chloride (29.2% Ca) | — | 10.3 |
| Magnesium Chloride Brine (8.6% Mg.) | 5.8 | 5.8 |
| Water | — | 2.0 |

29% ammonia added for pH adjustment.

Example 2 uses a beet molasses block formula substantially identical in formulation to the cane molasses system of Example 1, as is shown in Table 3. The native contents of calcium and magnesium are 0.3 weight percent of calcium and 0.19 weight percent of magnesium. The reaction liquid was prepared by mixing in equal weight proportions a first solution containing the phosphorus and one-half of the magnesium and a second solution containing the calcium and the other one-half of the magnesium. Formulations for these solutions are summarized in Table 3 for 0.75 weight percent of added magnesium.

In the absence of magnesium, optimum hardness occurs over a very narrow pH range (about 2.9 to 3.0, pH units). However, with addition of magnesium and adjustment of the calcium to magnesium ratio to fall within the required range, hardness increases and the effective pH range broadens, ranging from about 3.0 to 4.0 pH units. In the beet molasses system, maximum hardness occurs when 0.75 percent magnesium is used and the pH is about 3.5.

TABLE 3

| FORMULATION FOR EXAMPLE 2 | | |
|---|---|---|
| | P Stock Wt. % | Ca Stock Wt. % |
| 50% Urea Solution | 10.0 | 10.0 |
| Phosphoric Acid (23.8% P) | 12.6 | — |
| Beet Molasses (81° BRIX) | 68.7 | 69.0 |
| Calcium Chloride (29.2% Ca) | — | 10.3 |
| Magnesium Chloride Brine (8.6% Mg.) | 8.7 | 8.7 |
| Water | — | 2.0 |

29% ammonia added for pH adjustment.

EXAMPLE 3

To determine the blocking effects of added magnesium without contribution from native magnesium in the molasses, a molasses system was formulated using a beet molasses containing very low calcium and magnesium (less than 0.01 weight percent magnesium and 0.04 weight percent calcium). The formulation for this system is shown in Table 4. The calcium to magnesium ratio of this beet molasses formulation containing no added magnesium is very high, greater than 123.

TABLE 4

| FORMULATION FOR EXAMPLE 3 (NO ADDED MAGNESIUM) | | |
|---|---|---|
| | P Stock Wt. % | Ca Stock Wt. % |
| 50% Urea Solution | 10.0 | 10.0 |
| Phosphoric Acid (25.4% P) | 11.3 | — |
| Salt | 10.0 | — |
| Beet Molasses (87° BRIX) | 61.4 | 68.3 |
| Calcium Chloride (29.2% Ca) | — | 8.4 |
| Water | 6.8 | 13.3 |

29% ammonia added for pH adjustment.

A second formulation was prepared from the same beet molasses to contain 1.5 weight percent phosphorus, 1.2 weight percent calcium, and 0.6 weight percent of added magnesium, giving a weight ratio of calcium to magnesium of about 1.9. The formulation for the beet molasses system containing added magnesium is shown in Table 5.

TABLE 5

| FORMULATION FOR EXAMPLE 3 (ADDED MAGNESIUM) | | |
|---|---|---|
| | P Stock Wt. % | Ca Stock Wt. % |
| 50% Urea Solution | 10.0 | 10.0 |
| Phosphoric Acid (23.8% P) | 12.6 | — |
| Salt | 10.0 | — |
| Beet Molasses (87° BRIX) | 58.2 | 65.6 |
| Calcium Chloride (29.2% Ca) | — | 8.4 |
| Magnesium Chloride Brine (8.6% Mg.) | 7.1 | 8.0 |

TABLE 5-continued

| FORMULATION FOR EXAMPLE 3 (ADDED MAGNESIUM) | | |
|---|---|---|
| | P Stock Wt. % | Ca Stock Wt. % |
| Water | 2.1 | 8.0 |

29% ammonia added for pH adjustment.

Figure 3:
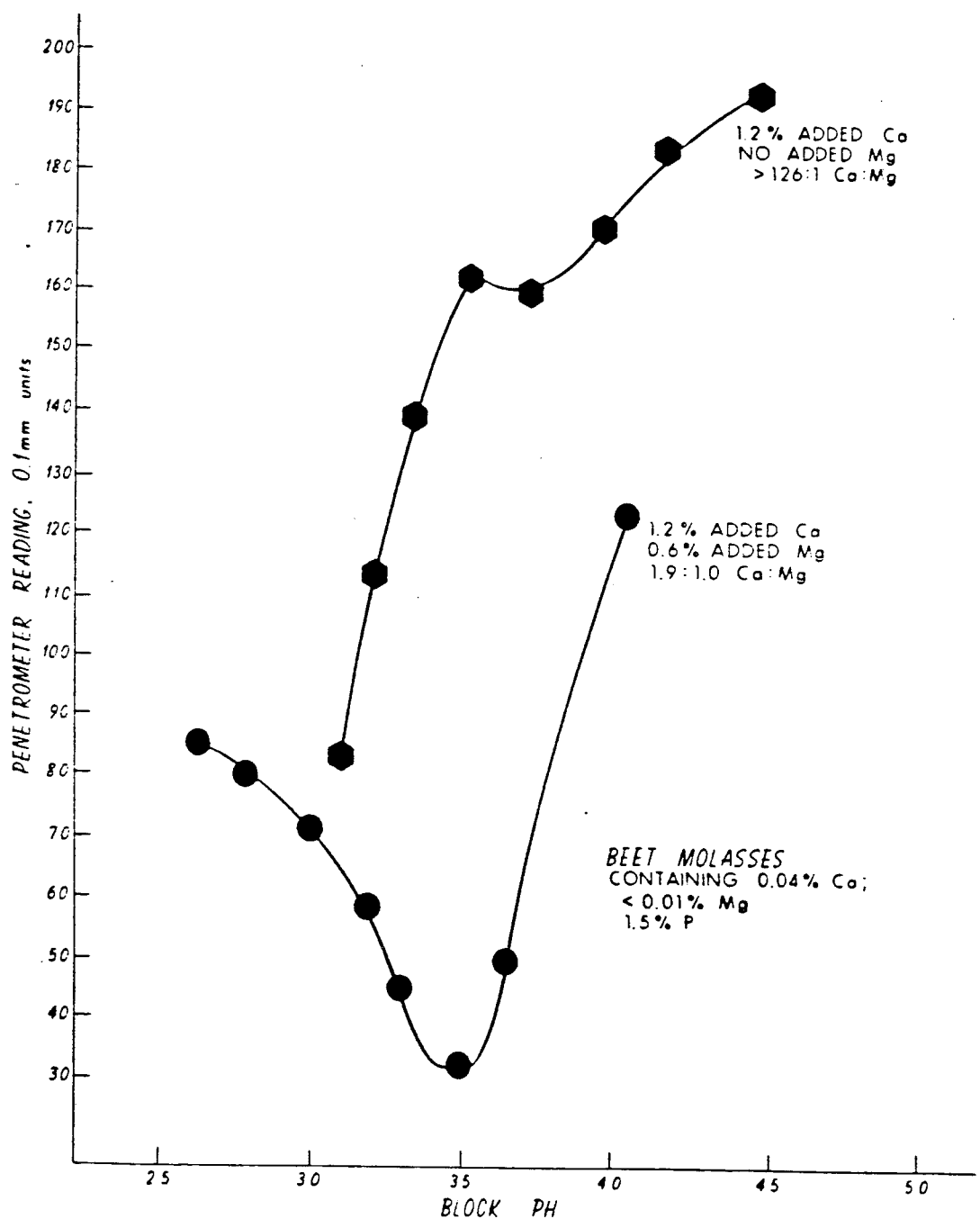

As illustrated in FIG. 3, the formulation containing no added magnesium (Table 4) yields a block having increasing hardness with decreasing pH, but the hardness for those pH values tested was consistently less than the comparable magnesium-containing formulation. By contrast, the formulation containing 0.6 weight percent of added magnesium (Table 5) yields a block having a hardness of about 30 units when the pH is about 3.5. At lower pH, the hardness of the block falls off. This example shows that by adjusting the calcium to magnesium weight ratio to 1.9, an acid magnesium-containing molasses block can be obtained having a hardness of about 30 units, which is much harder than the block containing no magnesium.

EXAMPLE 4

To demonstrate that within the critical pH range gelation depends upon maintaining a favorable ratio of calcium to magnesium rather than upon the content of calcium or magnesium alone, the inferior formulation from Example 1 containing 1.5 weight percent of magnesium was improved by adding sufficient calcium to bring the calcium to magnesium weight ratio to 2, the preferred value within the critical range between 1.5 and 3. As can be seen in FIG. 4, hardness of the block formed from the most unsatisfactory formulation illustrated in Example 1 was restored, with the hardest block (having hardness of about 31 units) being formed from an improved liquid solution having a pH of about 2.7. Formulations used in Example 4 are summarized in Table 6.

This example illustrates that levels of magnesium high enough to meet nutritional requirements (i.e., above 1.0 weight percent) can be incorporated into a molasses block formulation without causing undesirable softening of the block if the weight ratio of calcium to magnesium (including native calcium and magnesium in the molasses) is adjusted to maintain a value within the critical range.

TABLE 6

| FORMULATION FOR EXAMPLE 4 | | |
|---|---|---|
| | P Stock Wt. % | Ca Stock Wt. % |
| UNIMPROVED BLOCK (Ca/Mg Wt. Ratio 1.1) | | |
| 50% Urea Solution | 11.0 | 11.0 |
| Phosphoric Acid (23.8% P) | 12.6 | — |
| Cane Molasses (84° BRIX) | 59.0 | 59.3 |
| Calcium Chloride (29.2% Ca.) | — | 10.3 |
| Magnesium Chloride Brine (8.6% Mg.) | 17.4 | 17.4 |
| Water | — | 2.0 |
| IMPROVED BLOCK (Ca/Mg Wt. Ratio 2.0) | | |
| 50% Urea Solution | 11.0 | 11.0 |
| Phosphoric Acid (23.8% P) | 12.6 | — |
| Cane Molasses (84° BRIX) | 59.7 | 46.2 |
| Calcium Chloride (29.2% Ca.) | — | 21.5 |
| Magnesium Chloride Brine (9.0% Mg.) | 16.7 | 16.7 |

TABLE 6-continued

| FORMULATION FOR EXAMPLE 4 | | |
|---|---|---|
| Water | — | 4.6 |

29% ammonia added for pH adjustment.

EXAMPLES 5-19

To determine the best method for measuring the pH of hardened molasses blocks, a pH results from three methods of measurement were compared with the pH values of the fresh liquid mixture from which each block tested had been solidified. By the first method, the pH of a 50 weight percent water slurry of the hardened block was measured. By the second method, a surface of the hardened block was dampened just enough to get a pH reading and the reading was recorded. Measurements were made using Corning Model 145 digital pH meter affixed to an Orion Combination Electrode No. 91-36 having a flat bottom.

Readings were made for three sets of molasses blocks, the first set containing no added magnesium but containing 2.6 weight percent of added calcium and 1.6 weight percent of added phosphorus. The second set of blocks has the relatively high content of added magnesium of 1.5 weight percent and also contains 3.1 weight percent of added calcium and 1.5 weight percent of added phosphorus. The third set of block pH readings compares the fresh liquid mixtures with block portions reliquefied by shearing at 400 rpm for 2 minutes. The formulation of the blocks used in this set is identical to the 0.5% Mg formula of Example 1. Results of the pH tests are summarized in Table 7.

TABLE 7

| COMPARISON OF pH DETERMINATION METHODS | | | |
|---|---|---|---|
| Example No. | pH of Fresh Liquid Mixture | pH of 50 Wt. % Water Slurry | pH of Damp Block |
| GROUP A - NO ADDED MAGNESIUM | | | |
| 5 | 2.7 | 3.4 | 2.8 |
| 6 | 3.8 | 4.0 | 3.6 |
| 7 | 4.5 | 4.7 | 4.6 |
| 8 | 5.2 | 5.6 | 5.4 |
| GROUP B - 1.5 WT. PERCENT ADDED MAGNESIUM | | | |
| 9 | 1.9 | 3.0 | 2.3 |
| 10 | 2.5 | 3.6 | 2.9 |
| 11 | 3.1 | 4.4 | 3.9 |
| 12 | 4.1 | 5.4 | 4.4 |
| Example No. | pH of Fresh Liquid Mixture | pH of Re-Mixed Block (no water added) | |
| GROUP C - 0.5 WT. PERCENT ADDED MAGNESIUM | | | |
| 13 | 2.8 | 2.5 | |
| 14 | 3.2 | 2.9 | |
| 15 | 3.4 | 3.2 | |
| 16 | 3.7 | 3.6 | |
| 17 | 4.0 | 4.0 | |
| 18 | 4.4 | 4.4 | |
| 19 | 4.6 | 4.6 | |

As can be seen from the data in Table 7, for all molasses-containing blocks, when pH of the block is determined by making a 50 weight percent water slurry from the solid block, pH readings are substantially higher than when pH of the block is determined directly by dampening its surface sufficiently to get a pH reading with a flat-bottomed electrode. This is as would be expected considering dilution of the salts present. The differences are most pronounced in the high magnesium, high calcium salt series. Thus, it has been determined that dampened surface pH measurements of hardened blocks are in close agreement with the fresh product liquid and should provide a reliable quality checkpoint. As noted in Group C, the pH readings for the remixed (liquefied) blocks are also in close agreement with the fresh product liquid. Therefore, in this invention the pH of the hardened block is determined either by dampening the surface of the block or by remixing as described to measure the pH.

EXAMPLES 20-21

An experiment was devised to compare the hardness characteristics of single stock molasses compositions prepared and stored at acidic and basic pH and hardened using commodity phosphate solutions with the hardness characteristics of the dual stock solutions employed in Examples 1 and 2. Two molasses block systems were studied, one using cane molasses and one using beet molasses. For each molasses block system, three sets of molasses stocks are prepared: a single stock solution having an acidic pH of about 3; a single stock solution having a basic pH of about 9; and dual stock solutions having the molasses equally divided between the calcium-molasses and phosphorus-molasses stock solutions. The optimum formulations for the cane block system are displayed in Table 2 for the dual stock solutions and in Table 8 for the acidic and basic single stock solutions. Optimum formulations for the beet block system are displayed in Table 3 for the dual stock solutions nd in Table 9 for the acidic and basic single stock solutions.

TABLE 8

FORMULATIONS FOR OPTIMUM HARDNESS -
EXAMPLE 20 - CANE MOLASSES

Single Stock Basic Solution
Formulation, wt. % (For Use with Phosphoric Acid)

| Stock Solution | | |
|---|---|---|
| Water | 4.3 | |
| Lime[a] (CaO) | 1.4 | |
| 50% Urea Solution | 6.4 | |
| Urea | 4.3 | pH 8.9 |
| Calcium Chloride (29.2% Ca) | 2.1 | |
| Cane Molasses[b] (84° BRIX) | 75.6 | |
| Magnesium Chloride Brine (9% Mg) | 6.0 | |
| Phosphorus Solution | % H$_3$PO$_4$ | |
| Phosphoric Acid (23% P) | 75 | |
| Reaction Mixture | Wt. % | |
| Stock Solution | 93.7 | |
| Phosphorus Solution | 6.3 | |

Single Stock Acid Solution
Formulation, wt. % (For Use with Ammonium Phosphate)

| Stock Solution | | |
|---|---|---|
| 50% Urea Solution | 7.6 | |
| Urea | 1.5 | |
| Hydrochloric Acid (37% HCl) | 2.3 | pH 2.7 |
| Calcium Chloride (29.2% Ca) | 6.0 | |
| Cane Molasses[b] (84° BRIX) | 76.1 | |
| Magnesium Chloride Brine (9% Mg) | 6.5 | |
| Phosphorus Solution | % P$_2$O$_5$ | |
| Ammonium phosphate (10.5% P) (8 - 24 - 0) | 24 | |
| Reaction Mixture | | |
| Stock Solution | 85.7 | |
| Phosphorus Solution | 14.3 | |

[a]"Pre-slaked" in water to maximize colloidal dispersion.
[b]Native calcium and magnesium 0.6 and 0.4 wt. %, respectively.

TABLE 9

FORMULATIONS FOR OPTIMUM HARDNESS
EXAMPLE 21 - BEET MOLASSES

Single Stock Basic Solution
Formulation, wt. % (For Use with Phosphoric Acid)

TABLE 9-continued
FORMULATIONS FOR OPTIMUM HARDNESS
EXAMPLE 21 - BEET MOLASSES

| Stock Solution | | |
|---|---|---|
| Water | 4.3 | |
| Lime$^a$ (CaO) | 1.4 | |
| 50% Urea Solution | 3.2 | |
| Urea | 4.3 | pH 9.2 |
| Calcium Chloride (29.2% Ca) | 2.1 | |
| Beet Molasses$^b$ (81° BRIX) | 75.9 | |
| Magnesium Chloride Brine (9% Mg) | 8.9 | |
| Phosphorus Solution | % H$_3$PO$_4$ | |
| Phosphoric Acid (23% P) (0 - 52 - 0) | 75 | |
| Reaction Mixture | Wt. % | |
| Stock Solution | 93.7 | |
| Phosphorus Solution | 6.3 | |

Single Stock Acid Solution
Formulation, wt. % (For Use with Ammonium Phosphate)

| Stock Solution | | |
|---|---|---|
| 50% Urea Solution | 4.7 | |
| Urea | 1.5 | |
| Hydrochloric Acid (37% HCl) | 2.3 | pH 3.3 |
| Calcium Chloride (29.2% Ca) | 6.0 | |
| Beet Molasses$^2$ (81° BRIX) | 75.8 | |
| Magnesium Chloride Brine (9% Mg) | 9.7 | |
| Phosphorus Solution | % P$_2$O$_5$ | |
| Ammonium phosphate (10.5% P) (8 - 24 - 0) | 24 | |
| Reaction Mixture | | |
| Stock Solution | 85.7 | |
| Phosphorus Solution | 14.3 | |

$^a$"Pre-slaked" in water to maximize colloidal dispersion.
$^b$Native calcium and magnesium 0.3 and 0.2 wt. %, respectively.

The dual stock solutions for the cane and beet systems are prepared as described in Examples 1 and 2, respectively. The single stock solutions for the optimum hardness block formulations are prepared by dissolving all the ingredients as listed in Tables 8 and 9 in the molasses solution except for the phosphorus-containing ingredient. The optimum basic single stock solution is adjusted to a pH of 8.9 for the cane molasses system and 9.2 for the beet molasses systems (as shown in Tables 8 and 9, respectively) by addition of lime (CaO) which has been pre-slaked in water to maximize colloidal dispersion. When it is desired to initiate the blocking reaction, the indicated amount of orthophosphoric acid having a concentration of about 75 weight percent orthophosphoric acid is added to the basic single stock solution while blending with a Lightnin mixer. Using this procedure, a series of reaction mixtures are prepared having a final pH within the range between about 2.6 and 3.8, as indicated in FIGS. 5 and 6.

Similarly, to the acidic single stock solutions the indicated amount of 8-24-0 (N-P$_2$O$_5$-K$_2$O) ammonium orthophosphate is added while blending with a Lightnin mixer. A series of mixtures is prepared having a final pH within the range between about 3.3 and 4.4 as shown in FIGS. 5 and 6. The calcium to magnesium ratio in the cane molasses system is 2.4:1 and in the beet molasses system is 1.9:1. The hardness of blocks having various final pH values within these ranges was measured for each of the three sets of stocks.

To further compare the effect upon blocking characteristics of storing the single stock solutions, three sets of hardness data were collected, one set recording the hardness of blocks made from fresh single stock solution and two sets recording the hardness of blocks made after storing the single solution for four weeks. To determine the additional effect upon hardness of storage temperature, one set of stock solution was stored at 70° F. and one set of stock was stored at 105° F. The difference in block hardness between the three sets of data was negligible.

The hardness results for the cane and beet molasses systems for fresh solutions are summarized in FIGS. 5 and 6, respectively. Variations in the block hardness profiles resulting from the method of combining the ingredients of the blocks are attributed to the complex non-equilibrium character of calcium phosphate precipitation reactions, as well as to the inherently higher water content in the acidic molasses-8-24-0 ammonium orthophosphate blend.

While particular embodiments of the invention have been described, it will be understood that the invention is not limited thereto since many obvious modifications can be made. It is intended to include within this invention any such modification as will fall within the scope of the appended claims.

What is claimed is:

1. An aqueous molasses based feed supplement stock solution consisting essentially of:
   (a) 60 to 87 weight percent molasses having a solids concentration of about 60° to about 90° BRIX;
   (b) at least about 0.8 weight percent dissolved magnesium ions; and
   (c) dissolved calcium ions, wherein the weight ratio of the dissolved calcium ions to the dissolved magnesium ions is about 1.5 to about 3, and the solution is capable of remaining fluid for at least 7 days and is used in the manufacture of solid, acidic animal feed blocks.

2. The solution of claim 1 wherein the weight ratio of the dissolved calcium ions to the dissolved magnesium ions is between about 1.75 and about 2.25.

3. The solution of claim 1 substantially devoid of phosphate.

4. The solution of claim 3 substantially devoid of sulfate not indigenous to the molasses.

5. The solution of claim 3 substantially devoid of magnesium oxide.

6. The solution of claim 1 substantially devoid of sulfate not indigenous to molasses and substantially devoid of phosate and magnesium oxide.

7. The solution of claim 1 devoid of phosphate.

8. The solution of claim 7 devoid of sulfate not indigenous to the molasses.

9. The solution of claim 7 devoid of magnesium oxide.

10. The solution of claim 1 devoid of sulfate not indigenous to molasses, phosphate, and magnesium oxide.

11. An aqueous molasses based feed supplement stock solution consisting essentially of:
   (a) 60 to 87 weight percent molasses having a solids concentration of about 60° to about 90° BRIX;
   (b) dissolved magnesium ions; and
   (c) at least about 1.75 weight percent dissolved calcium ions, wherein the weight ratio of the dissolved calcium ions to the dissolved magnesium ions is about 1.5 to about 3, and the solution is capable of remaining fluid for at least 7 days and is used in the manufacture of solid, acidic animal feed blocks.

12. The solution of claim 11 comprising at least about 1.9 weight percent dissolved calcium ions.

13. The solution of claim 11 wherein the weight ratio of the dissolved calcium ions to the dissolved magnesium ions is between about 1.75 and about 2.25.

14. The solution of claim 11 substantially devoid of phosphate.

15. The solution of claim 14 substantially devoid of sulfate not indigenous to the molasses.

16. The solution of claim 14 substantially devoid of magnesium oxide.

17. The solution of claim 11 substantially devoid of sulfate not indigenous to molasses and substantially devoid of phosphate and magnesium oxide.

18. The solution of claim 11 devoid of phosphate.

19. The solution of claim 18 devoid of sulfate not indigenous to the molasses.

20. The solution of claim 18 devoid of magnesium oxide.

* * * * *